(12) United States Patent
Class

(10) Patent No.: US 6,245,861 B1
(45) Date of Patent: Jun. 12, 2001

(54) USE OF PEROXIDES TO CROSSLINK RUBBER COMPOSITIONS CONTAINING HIGH VINYL STYRENE-BUTADIENE RUBBER

(75) Inventor: Jay Bernard Class, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/158,978

(22) Filed: Sep. 10, 1998

Related U.S. Application Data
(60) Provisional application No. 60/058,476, filed on Sep. 10, 1997.

(51) Int. Cl.$^7$ ........................................................ C08F 8/00
(52) U.S. Cl. .................................... 525/332.5; 525/332.9; 525/333.2; 525/387
(58) Field of Search ............................. 525/332.5, 333.2, 525/387, 332.9

(56) References Cited

U.S. PATENT DOCUMENTS

| | | | |
|---|---|---|---|
| 5,446,191 | * | 8/1995 | Suyama ................................. 525/383 |
| 5,932,660 | * | 8/1999 | Meijer ................................... 525/256 |

\* cited by examiner

*Primary Examiner*—Bernard Lipman
(74) *Attorney, Agent, or Firm*—Robert P. O'Flynn O'Brier; Gary A. Samuels

(57) ABSTRACT

High vinyl styrene-butadiene rubber is cured through the use of organic peroxides. The organic peroxide may be used singly or in combination with sulfur curing ingredients to cure the high vinyl styrene-butadiene rubber wherein the organic peroxide to sulfur curing ingredient is at a molar ratio of from about 3:1 to about 1:3.

9 Claims, 1 Drawing Sheet

USE OF PEROXIDES TO CROSSLINK RUBBER COMPOSITIONS CONTAINING HIGH VINYL STYRENE-BUTADIENE RUBBER

CROSS-REFERENCE TO RELATED APPLICATION

The present application claims priority under 35 U.S.C. §119(e) of U.S. Provisional Application No. 60/058,476, filed Sep. 10, 1997; the disclosure of which is expressly incorporated by reference herein in their entirety.

FIELD OF THE INVENTION

This inventions relates to the crosslinking of high vinyl styrene-butadiene rubber. More particularly, this invention relates to the crosslinking of high vinyl styrene-butadiene rubber using organic peroxides and organic peroxide sulfur blends.

BACKGROUND OF THE INVENTION

Polymerization of unsaturated organic compounds by peroxides is well known in polymer synthesis. The small unsaturated organic molecules are the monomers which are polymerized to produce many various plastic products. Among those monomers are ethylene, propylene, styrene, α-methyl styrene, vinyl toluene, vinyl ethers, and vinyl esters.

Peroxides have been used for many years to crosslink rubber compositions, however they have not found general use in the tire industry. Among the concerns that the tire industry has about the use of peroxides, some of these concerns relate to the radical mechanism of peroxide crosslinking and to the structure of the crosslink. Compositions cured with peroxides are thought to have shorter crosslinks which are less flexible than comparable crosslinks from sulfur-cured compositions and therefore peroxide-cured compositions are believed to exhibit less resistance to abrasion and cut growth. Also, peroxides are believed in the tire industry to be more sensitive to compounding ingredients and therefore, designing a peroxide compound would limit the flexibility available in a sulfur-cure system.

BRIEF DESCRIPTION OF THE INVENTION

The present invention relates to crosslinkable rubber compositions comprising an organic peroxide and a high vinyl styrene butadiene rubber. The crosslinkable rubber compositions may additionally comprise a sulfur curing ingredient, wherein the organic peroxide to sulfur curing ingredient is at a molar ratio of from about 3:1 to about 1:3.

The high vinyl styrene butadiene rubber comprises a vinyl mole percentage as measured using NMR of greater than about fifteen percent (15%), preferably greater than about twenty five (25%), more preferably of greater than about forty percent (40%).

The present invention also relates to the process for curing the crosslinkable rubber compositions and to the crosslinked rubber compositions wherein the crosslinked rubber compositions comprise an organic peroxide and a high vinyl styrene butadiene rubber.

The crosslinked rubber compositions of the present invention are useful in making final articles such as hoses, belts, parts and particularly tires.

DETAILED DESCRIPTION OF THE INVENTION

Figure 1:
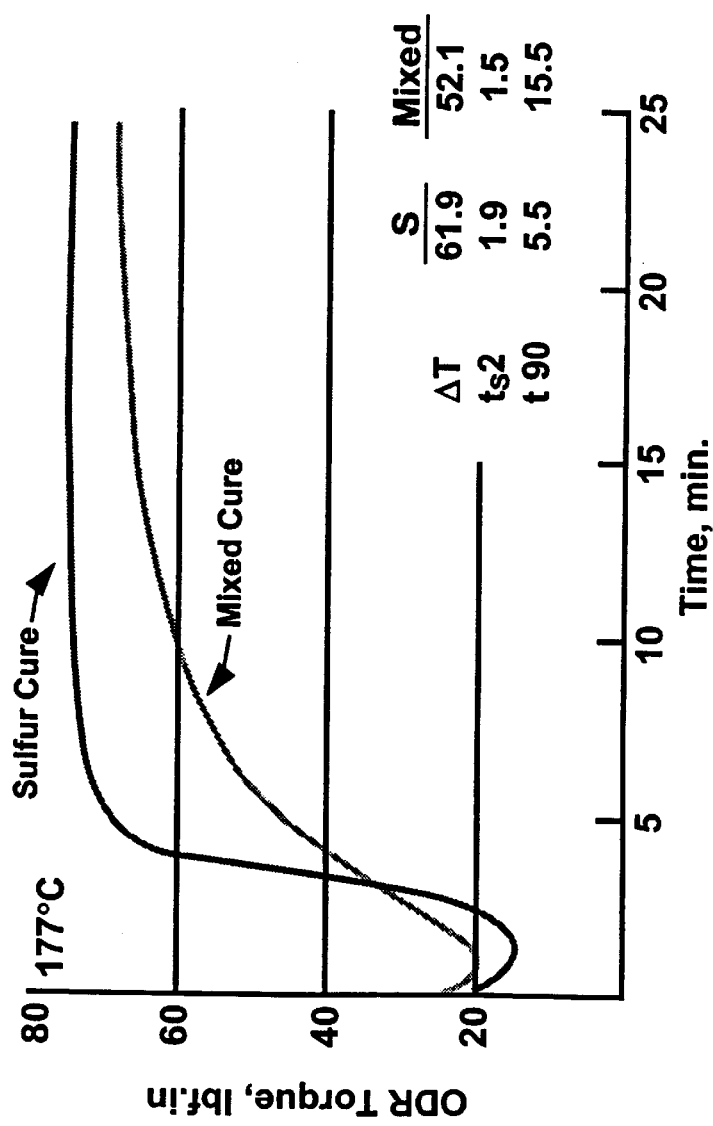
FIG. 1 depicts a graph of the ODR torque versus time of the sulfur-cure and the mixed-cure formulations found in Example 1.

With the development of solution processes for producing styrene-butadiene rubber (SBR), many new variations of SBR can be manufactured. Not only can the ratio of styrene to butadiene be changed, but the percentage of cis configuration in the SBR can be controlled by the selection of the catalyst. Also, the ratio of 1,2-polymerization to 1,4-polymerization in the SBR can be adjusted.

One benefit of the development of the solution process for producing SBR is that high vinyl styrene-butadiene rubber can now be produced. High vinyl styrene-butadiene rubber (high vinyl SBR) is defined herein as SBR having a vinyl mole percentage as measured using NMR of greater than about fifteen percent (15%), preferably of greater than about twenty five percent (25%), more preferably of greater than about forty percent (40%). A method for the measurement of the vinyl mole percentage is through the use of $^{13}C$ NMR.

In the silicone rubber industry, incorporation of pendant vinyl groups has been known to increase the rate of polymerization and reduce the temperature required to manufacture silicone rubber and provide more tightly cured silicone rubber compositions. These benefits may now be obtained when crosslinking high vinyl SBR since the high vinyl SBR contains pendant vinyl groups. These pendant vinyl groups are able to react with organic peroxides to crosslink and cure the high vinyl SBR.

The organic peroxides of use in the present invention are those organic peroxides commonly used in the art to crosslink polymers, including rubbers. Among the organic peroxides of use are vulcanizing, and polymerization agents comprising dicumyl peroxide (Di-cup® organic peroxides available from Hercules Incorporated). Also among the organic peroxides of use is α,α'-bis(t-butylperoxy) diisopropylbenzene. The α,α'-bis(t-butylperoxy) diisopropylbenzene has been available as a blend of the meta and para isomers where the molar ratio of meta to para isomers is about 2.0/1 (as Vul-Cup® R organic peroxide available from Hercules Incorporated, Wilmington, Del.).

The organic peroxides of use in the present invention may be used alone or in combination with conventional sulfur curing ingredients. Conventional sulfur curing ingredients include sulfur in its elemental form as well as various insoluble sulfur-bearing materials which release sulfur when heated. The amount of organic peroxide to sulfur curing ingredients may be at a molar ratio of from about 3:1 to about 1:3, preferably at a molar ratio of about 1:1. The difference in properties resulting from peroxide crosslinking or sulfur crosslinking is related to the nature of the crosslink. Peroxide curing does not introduce a foreign component into the crosslinked polymer structure. This maintains the inherent stability of the polymer. The peroxide crosslinks consist of direct linking of two polymer chains through a carbon-carbon bond. The sulfur cure gives a polysulfidic linkage. The carbon-carbon bond is rigid and strong, which results in its very low compression set and excellent heat resistance. The polysulfidic linkage is more flexible and is reversible at elevated temperatures. This provides tear strength and abrasion resistance to a composition. Peroxide curing does have one feature that is not available with sulfur curing, multi-functional unsaturated compounds, known as coagents, can be added to modify cured properties. Coagents can increase the modulus and hardness of a peroxide-cured composition.

Multi-functional unsaturated compounds (coagents) are often used to modify the physical properties of peroxide-crosslinked compositions. Typical coagents are trimethylolpropane trimethacrylate, triallyl isocyanate, pentaerythritol tetramethacrylate, and the like. The coagent may be selected from the group consisting of trimethylolpropane trimethacrylate, triallyl isocyanate and pentaerythritol tetramethacrylate. Low molecular weight 1,2-polybutadiene may also be used as a coagent for radical-initiated crosslinking. The 1,2-polymerization leaves a pendant vinyl group on the polymer chain which is available for participation in the crosslinking reaction.

Other ingredients commonly used in rubber compounding can be included in the high vinyl SBR compositions of the present invention, for example, fillers, extenders, pigments, plasticizers, softeners, stabilizers, etc.

Among the stabilizers of use in the present invention are phenyl-β-naphthylamine, di-β-naphthyl-p-phenylenediamine, sym-di-β-naphthyl-p-phenylenediamine, styrenated diphenylamines, N-isooctyl-p-amino-phenol, the reaction product of diphenylamine and acetone, polymerized 1,2-dihydro 2,2,4-trimethylquinoline (TMQ), 4,4'-thio-bis(6-tert-butyl-m-cresol), the reaction product of crotonaldehyde and 3-methyl-6-tert-butyl-phenol, nickel dibutyldithiocarbamate, the zinc salt of 2-mercapto-benzimidazole, and nickel dimethyldithiocarbamate. These material are typically added in the range of about 0.1 phr to 5 phr or more of the total composition, by weight.

Among the fillers of use in the present invention are carbon black and silica.

Incorporation of silica as a reinforcing agent for tire treads has become a major goal for tire manufactures. Silica has been found to reduce the rolling resistance of tires and therefore increase their mileage. It has also been found that the preferred elastomers in the formulation of these tires are high vinyl SBR. These polymers often constitute as much as 75% by weight of the rubber composition with the balance being polybutadiene rubber.

The ingredients, including the organic peroxides and or the organic peroxides and the sulfur curing ingredients, can be incorporated or admixed with the high vinyl SBR in any desired fashion commonly used in the rubber compounding art. For example, they can be uniformly blended with the rubber by mixing in a high intensity internal mixer, such as a "Banbury" mixer; or by simply milling on a conventional rubber mill to prepare green or uncured compositions of the present invention. By this means, the agents are uniformly distributed throughout the rubber and uniform crosslinking is effected when the crosslirkable rubber composition is thereafter subjected to curing heat.

The invention is illustrated by the following Procedures and Examples; these are provided for the purpose of representation, and are not to be construed as limiting the scope of the invention. Unless stated otherwise, all percentages, parts, etc. are by weight.

PROCEDURES

The extent of cure of the following examples was measured from data obtained using a Monsanto oscillating disk rheometer (ODR) following the procedure of ASTM D2084-92.

NMR measurements were determined using the following procedure. The samples were dissolved in deuterated chloroform and placed in a 10 mm NMR tube for $^{13}C$ NMR analysis. The NMR instrument used for analysis was a BRUKER AMX Spectormeter with a $^{13}C$ operating frequency of 100.624 MHZ. The $^{13}C$ spectra were acquired with continuous $^1H$ decoupling. Experimental parameters included a pulse tip angle of 70 degrees, acquisition time of 1.3 seconds, data points of 64K, recycle (delay) time of 3.0 seconds, sweep width of 25,000 Hz, number of scans between 2K–8K.

EXAMPLES

Example 1

It has been demonstrated that a typical tread composition based on a blend of high vinyl SBR and polybutadiene rubber, containing silica as the reinforcing agent, can be crosslinked by a peroxide, or a mixture of peroxide and sulfur curing ingredients. Peroxide curing was evaluated in a typical silica-reinforced tread composition based on high-vinyl solution SBR and polybutadiene. A mixed peroxide-sulfur cure was compared with a standard sulfur cure. The sulfur-cure ingredients in the mixed cure were reduced to 25% of the level used in the control compound. Additional crosslinking was provided by adding 1.5 phr of an organic peroxide (Vul-Cup® 40KE crosslinking agent available from Hercules Incorporated). Aromatic oil in the control was replaced with naphthenic oil. Stearic acid was removed and amine antioxidant was replaced with TMQ.

The compositions and their physical properties are set forth in the following tables.

| Formulation | sulfur-cure (comp. example) (parts by weight) | mixed-cure (example) (parts by weight) |
|---|---|---|
| Solution Styrene-Butadiene Rubber w/high styrene content (Cariflex ® S1215 rubber, Shell Chemical Co.) | 75 | 75 |
| Polybutadiene - 98% cis content (Budene ® 1207 rubber, Goodyear Tire & Rubber Co.) | 25 | 25 |
| Precipitated Silica (Ultrasil ® VN3 silica, DeGussa Corporation) | 75 | 75 |
| Bis-(3-[Triethoxysilyl]-propyl) tetrasulfide/Carbon black, mixture 1:1 by weight (Coupling Agent X50S, DeGussa Corporation) | 12.8 | 12.8 |
| Aromatic Hydrocarbon Oil (Sundex ® 8125 oil, Sun Refining & Marketing Co.) | 25 | — |
| Naphthenic Hydrocarbon Oil (Circosol ® 4240 oil, Sun Refining & Marketing Co.) | — | 25 |
| Stearic Acid | 2 | — |
| Paraffin Wax (Sunolite ® 240 wax, Witco Corporation) | 1.5 | 1.5 |
| Mixed ditolyl p-phenylene diamines (Wingstay ® 100 resin, Goodyear Tire & Rubber Co.) | 2 | — |
| Polymerized 1,2-dihydro-2,2,4 trimehtylquinoline (TMQ) (Agerite ® resin D, R. T. Vanderbilt Co., Inc.) | — | 2 |
| N-t-Butyl-2-benzothiazyl-sulfenamide (TBBS) (Santocure ® TBBS, Flexsys America L.P.) | 1.7 | 0.43 |
| Diphenyl Guanidine (DPG) (Akrochem Company) | 2 | 0.5 |
| Sulfur | 1.4 | 0.35 |
| Organic Peroxide (Vul-Cup ® 40KE organic peroxide, Hercules Incorporated) | — | 1.5 |

| ODR, 177° C. | sulfur-cure (comp. example) | mixed-cure (example) |
|---|---|---|

-continued

|  |  |  |
|---|---|---|
| ΔT | 61.9 | 52.1 |
| $t_s2$ | 1.9 | 1.5 |
| t90 | 5.5 | 15.5 |

| Mooney Scorch Δ3, 135° C. | sulfur-cure (comp. example) | mixed-cure (example) |
|---|---|---|
|  | 11.5 | 10.6 |

Physical Properties, Cured at 177° C. for 20 minutes

|  | sulfur-cure (comp. example) | | mixed-cure (example) | |
|---|---|---|---|---|
|  | Unaged | Aged, 125° C., 3 days | Unaged | Aged, 125° C., 3 days |
| Modulus, (M300), MPa | 14.6 | — | 16.1 | — |
| Tensile Strength, (TS), MPa | 18.9 | 9.6 | 16.8 | 9.9 |
| Elongation, (E), % | 360 | 100 | 310 | 140 |
| Hardness, Shore A, pts | 66 | 81 | 64 | 76 |

Physical Properties, Cured at 177° C. for 20 minutes

|  | sulfur-cure (comp. example) | mixed-cure (example) |
|---|---|---|
| Fatigue, kc | 208 | 51 |
| Comp. Set, 70 hr., 125° C., % | 71 | 50 |

FIG. 1 depicts a graph of the ODR torque versus time of the sulfur-cure and the mixed-cure formulations.

The mixed-cure system produced a marching modulus that was still evident after 24 minutes at 177° C., while the standard sulfur-cure did not. The marching modulus was not unexpected because the vinyl functionality of the solution SBR is very reactive and will rapidly crosslink by radical initiation. It was also found that the original compound with no added crosslinking ingredients exhibited marching modulus. Unaged physical properties were similar for the two compositions, but the mixed cure gave better property retention after aging at 125° C. As expected, compression set was reduced, but fatigue, scorch time, and tear strength were poorer.

Example 2

A compound was made having sulfur as the curing agent. Also, a compound was made without having any curing agent. Curing agents were subsequently added to this compound to make examples of the present invention.

The composition of the compound was as follows.

| Formulation | Comparative Example 2 (gms) | Composition 2 (gms) |
|---|---|---|
| Polybutadiene - 98% cis content (Budene ® 1207 rubber, Goodyear Tire & Rubber Co.) | 150 | 150 |
| Solution Styrene-Butadiene Rubber w/high styrene content (Cariflex ® S1215 rubber, Shell Chemical Co.) | 450 | 450 |
| Precipitated Silica (Ultrasil ® VN3 silica, DeGussa Corporation) | 450 | 450 |
| Bis-(3-[Triethoxysilyl]-propyl) tetrasulfide/Carbon black, mixture 1:1 by weight (Coupling Agent X50S, DeGussa Corporation) | 76.8 | 76.8 |
| Aromatic Hydrocarbon Oil (Sundex ® 8125 oil, Sun Refining & Marketing Co.) | 150 | — |
| Stearic Acid | 12 | — |
| Paraffin Wax (Sunolite ® wax, Witco Corporation) | 9 | 9 |
| ZnO | 15 | 15 |
| Mixed ditolyl p-phenylene diamines (Wingstay ® 100 resin, Goodyear Tire & Rubber Co.) | 12 | — |
| N-t-Butyl-2-benzothiazyl-sulfenamide (TBBS) (Santocure ® TBBS, Flexsys America L.P.) | 10.2 | — |
| Diphenyl Guanidine (DPG) (Akrochem Company) | 12 | — |
| Sulfur | 8.4 | — |
| Naphthenic Hydrocarbon Oil (Circosol ® 4240 oil, Sun Refining & Marketing Co.) | — | 150 |
| Polymerized 1,2-dihydro-2,2,4 trimehtylquinoline (TMQ) (Agerite ® resin D, R. T. Vanderbilt Co., Inc.) | — | 6 |

The above compounds were mixed in a Banbury mixer.

Subsequently, the 218.8 gm batches of the materials of composition 2 were mixed with an organic peroxide (Vul-Cup® 40KE available from Hercules Incorporated, Wilmington, Del.) in the following amounts:

| Example | Organic Peroxide (gms) |
|---|---|
| 2A | 2 |
| 2B | 1.5 |
| 2C | 1.0 |
| Blank | — |

ODR data, at 350° F., 3° Arc, 100 CPM and a 30 minute motor, for the above examples are as follows:

| Example | Comp. Ex 2 | 2A | 2B | 2C | Blank |
|---|---|---|---|---|---|
| Min. Torque (in-lbs) | 14.7 | 18.7 | 17.7 | 18.3 | 22.2 |
| Max Torque (in-lbs) | 68.6 | 71.8 | 64.7 | 54.0 | 39.3 |
| Δ Torque (in-lbs) | 53.9 | 53.1* | 47.0 | 35.7* | 17.1* |
| $t_s$ 2 min. | 1.9 | 1.3 | 1.45 | 1.8 | 6.2 |
| $t_{90}$ min. | 4.75 | 17.3* | 18.8* | 22.3* | 26.8 |

Values having an asterisk (*) were noted as having a marching modulus which indicates a gradual increase in these values over time.

The above examples demonstrate that compositions containing organic peroxides achieved comparable torque values to those obtained with sulfur. The Blank which contained no curing agent, showed some curing. This was concluded to be as a result of the high vinyl SBR curing on it own.

Example 3

Various compositions were made containing only SBR (either standard or high vinyl) and organic peroxide. In some cases, where indicated, an oil was present. These examples are presented to show the effect of the amount of vinyl functionality in the rubber. The vinyl functionality was determined through the use of NMR.

|  | comp 3A | 3B | comp 3C | comp 3D | 3E | Styrene mole % | Vinyl mole % | oil |
|---|---|---|---|---|---|---|---|---|
| SBR 1712 rubber[1] | 137.5 gm | — | — | — | — | 30 | 6 | y |
| Duradene ® [2] 715 rubber | — | 100 gm | — | — | — | 12 | 42 | n |
| Duradene ® 751 rubber | — | — | 137.5 gm | — | — | 25 | 8 | y |
| Duradene ® 753 rubber | — | — | — | 120 gm | — | 25 | 12 | y |
| Buna ® VSL3 5025-1 rubber | — | — | — | — | 137.5 gm | 25 | 50 | y |
| Vul-Cup ® 40KE organic peroxide[4] | 7 gm | 7 gm | 7 gm | 7 gm | 7 gm |  |  |  |

[1]SBR 1712 rubber is a styrene butadiene rubber having 23.5 wt % bound styrene, available from Ameripol Synpol Corporation
[2]Duradene rubbers were obtained from Firestone Tire Company, now available under new product designations from Bayer Corporation.
[3]Buna VSL rubber is available from Bayer Corporation.
[4]Vul-Cup ® organic peroxide is available from Hercules Incorporated.

ODR data, at 350°F., 30 Arc, 100 CPM and a 30 minute motor, for the above examples are as follows:

| Example | comp 3A | 3B | comp3C | comp 3D | 3E |
|---|---|---|---|---|---|
| Min Torque, in-lb | 6.1 | 10.4 | 6.0 | 9.9 | 7.5 |
| Max Torque, in-lb | 60.8 | 192.6 | 51.3 | 78.4 | 72.8 |
| Δ Torque, in-lb | 54.7 | 182.2 | 45.3 | 68.5 | 65.3* |
| $t_s$ 2 min | 1.3 | 0.7 | 1.5 | 1.7 | 1.4 |
| $t_{90}$ min | 12.3 | 3.0 | 12.8 | 12.7 | 16.7* |

The asterisk (*) indicates a sample with a marching modulus.

The above examples demonstrate the effectiveness of the cure of high vinyl SBR with organic peroxides.

Example 4

This example is presented to demonstrate the ability of organic peroxides to cure other high vinyl polymers, such as vinyl butyl rubber. Various compositions were made containing only rubber (either styrene or butyl) and organic peroxide.

|  | Comp 4 A | Comp 4 B | 4 C | 4D |
|---|---|---|---|---|
| Styrene-butadiene rubber, bound styrene 23.5%, vinyl content 47%)(Duradene ® 715 rubber, Firestone Polymers) | 100 gm | 100 gm | — | — |
| Vinyl-butadiene rubber (40% vinyl) (VBR-40 rubber, Bayer Corporation) | — | — | 100 gm | 100 gm |
| Aromatic Hydrocarbon Oil (Sundex ® 8125 oil, Sun Refining & Marketing Co.) | — | 37.5 gm | — | — |
| Organic Peroxide (Vul-Cup ® 40KE organic peroxide, Hercules Incorporated) | — | 7 gm | 7 gm | 3.5 gm |

VBR-40 is a vinyl butyl rubber which has 40 mole % vinyl, no styrene and no oil.

ODR data, at 350° F., 3° Arc, 100 CPM and a 30 minute motor, for the above examples are as follows:

| Example | Comp 4 A | Comp 4 B | 4C | 4D |
|---|---|---|---|---|
| Min Torque, in-lb | 7.9 | 3.1 | 19.3 | 18.1 |
| Max Torque, in-lb | 12.6 | 70.7 | >200 | >200 |
| Δ Torque, in-lb | 4.7* | 67.6 | >180 | >180 |
| $t_s$ 2 min | 18.3 | 1.4 | 0.6 | 0.75 |
| $t_{90}$ min | — | 15.1 | — | — |

The asterisk (*) indicates a sample with a marching modulus.

The above examples demonstrate the effectiveness of the vinyl functionality without the styrene present in a peroxide cure.

Finally, although the invention has been described with reference to particular means, materials, and embodiments, it should be noted that the invention is not limited to the particulars disclosed, and extends to all equivalents within the scope of the claims.

I claim:

1. A crosslinkable rubber composition comprising, an organic peroxide and a high vinyl styrene butadiene rubber comprising a vinyl mole percentage as measured using NMR of greater than about twenty five percent (25%).

2. The crosslinkable rubber composition of claim 1 wherein the organic peroxide comprises dicumyl peroxide.

3. The crosslinkable rubber composition of claim 1 wherein the organic peroxide comprises α,α'-bis(t-butylperoxy)diisopropylbenzene.

4. The crosslinkable rubber composition of claim 1 wherein high vinyl SBR comprises a vinyl mole percentage as measured using NMR of greater than about forty percent (40%).

5. The crosslinkable rubber composition of claim 1 wherein the crosslinkable rubber composition further comprises a filler.

6. The crosslinkable rubber composition of claim 5 wherein the filler is selected from the group consisting of carbon black and silica.

7. The crosslinkable rubber composition of claim 1 wherein the crosslinkable rubber composition further comprises a stabilizer selected from the group consisting of phenyl-β-naphthylamine, di-β-naphthyl-p-phenylenediamine, sym-di-β-naphthyl-p-phenylenediamine, styrenated diphenylamines, N-isooctyl-p-amino-phenol, the reaction product of diphenylamine and acetone, polymerized 1,2-dihydro 2,2,4-trimethylquinoline (TMQ), 4,4'-thio-bis(6-tert-butyl-m-cresol), the reaction product of crotonaldehyde and 3-methyl-6-tert-butyl-phenol, nickel dibutyldithiocarbamate, the zinc salt of 2-mercapto-benzimidazole, and nickel dimethyldithiocarbamate.

8. The crosslinkable rubber composition of claim 7 wherein the stabilizer is present in the range of about 0.1 phr to 5 phr of the total crosslinkable rubber composition.

9. a crosslinked rubber composition comprising, an organic peroxide and a high vinyl styrene butadiene rubber comprising a vinyl mole percentage as measured using NMR of greater than about twenty five percent (25%).

* * * * *